Figure 1B:
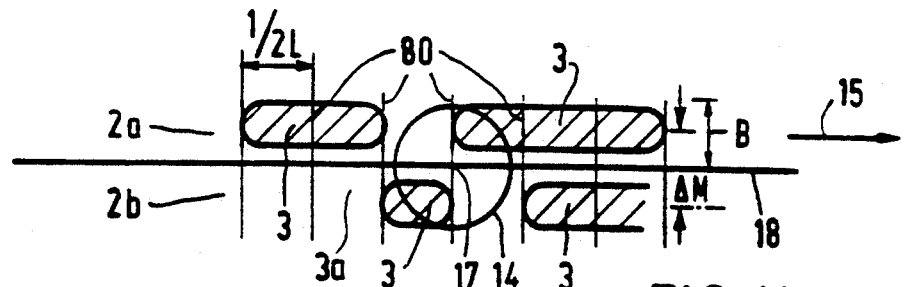

United States Patent [19]

Van Uijen et al.

[11] Patent Number: 5,255,263

[45] Date of Patent: Oct. 19, 1993

[54] INFORMATION READING SYSTEM AND RECORD CARRIER AND READING DEVICE FOR USE IN SUCH A SYSTEM

[75] Inventors: Cornelis M. J. Van Uijen; Yvonne A. Boersma; James H. Coombs, all of Eindhoven, Netherlands

[73] Assignee: U.S. Philips Corporation, New York, N.Y.

[21] Appl. No.: 845,289

[22] Filed: Mar. 3, 1992

[30] Foreign Application Priority Data

Mar. 7, 1991 [NL] Netherlands ............... 9100408

[51] Int. Cl.[5] .................. G11B 21/00; G11B 5/84
[52] U.S. Cl. .................. 369/275.3; 369/276; 360/114
[58] Field of Search ............ 369/275.1, 275.3, 275.4, 369/276, 120, 121, 105, 44.23, 100; 360/114

[56] References Cited

U.S. PATENT DOCUMENTS 4,654,838  3/1987  Sugiki ................... 369/120

FOREIGN PATENT DOCUMENTS 376626  7/1990  European Pat. Off. .
59-207433  11/1984  Japan .

Primary Examiner—Paul M. Dzierzynski
Assistant Examiner—Don Wong
Attorney, Agent, or Firm—David R. Treacy

[57] ABSTRACT

The disclosed information reading system comprises a record carrier (1) having at least two parallel tracks (2a, 2b) whose mutual distance is so small that the radiation beam (10) is modulated by the information patterns of the two tracks (2a, 2b) when the tracks are scanned by a focused radiation beam (10) along a line (18) indicating the center between the tracks (2a, 2b). The tracks comprise elementary areas, with the positions of the boundaries (80) of the elementary areas of the two tracks, viewed in the track direction, corresponding to each other. The information patterns in the tracks comprise elementary areas occupied by a mark and unoccupied elementary areas. The occupied elementary areas have a different influence on the radiation than the unoccupied elementary areas. When the two tracks (2a, 2b) are scanned, the center (17) of the scanning spot (14) is directed onto a line (18) which is located centrally between the tracks (2a, 2b). A radiation beam modulated by the scanned information pattern is projected onto a detection system (12). The information (I1, I2, I) which has been read is at least partly derived on the basis of one or more detection signals (Vt, Vppr, Vppt, Vppd) which are supplied by the detection system (12) at the instants when the radiation beam passes the boundaries (80) of the elementary areas.

14 Claims, 10 Drawing Sheets

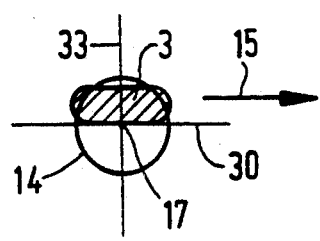
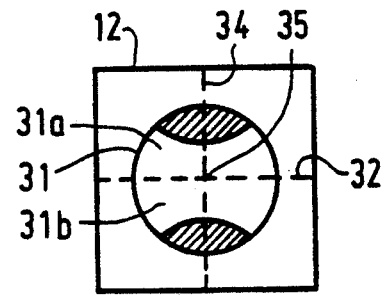
FIG.3a  FIG.3c
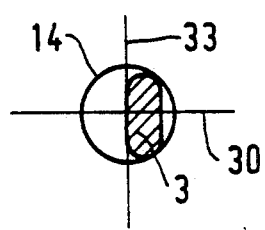
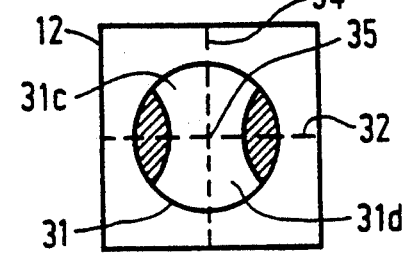
FIG.3b  FIG.3d
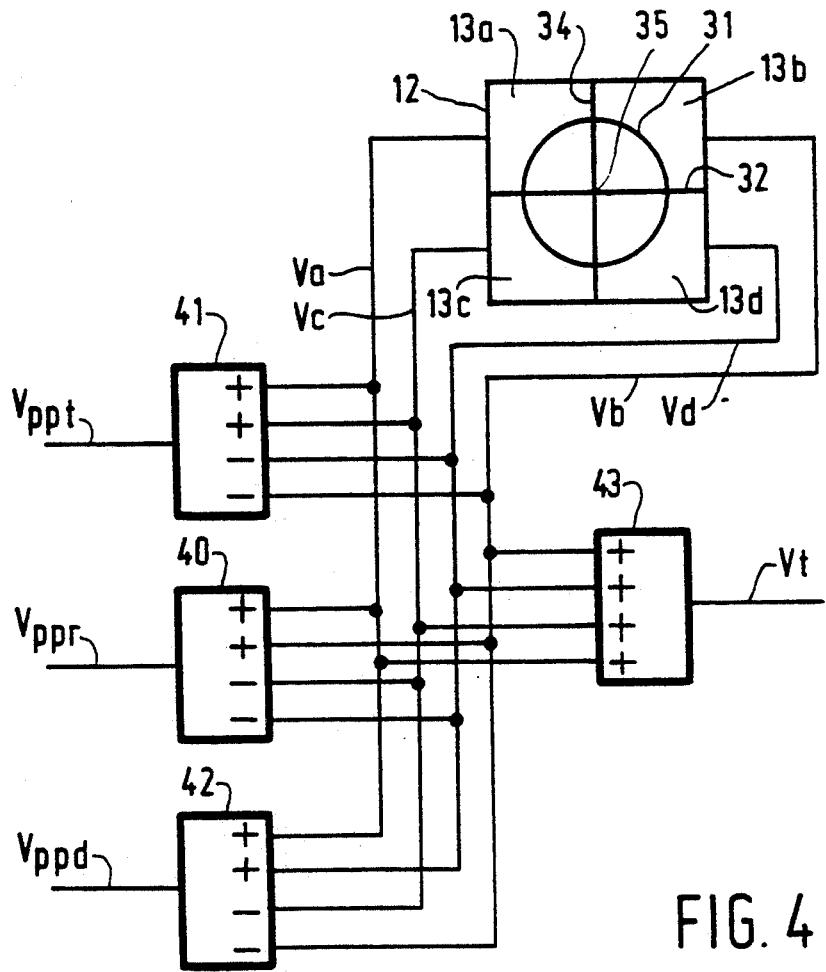
FIG. 4

| | $S_c$ | | $V_t$ | $V_{ppr}$ | $V_{ppt}$ | $V_{ppd}$ |
|---|---|---|---|---|---|---|
| | $C_1$ $C_2$ | | | | | |
| | $C_3$ $C_4$ | | | | | |
| $I_1, I_2 = 0,0$ (CG1) | 0 0 | | A3 | − | 0 | 0 |
| | 0 0 | | A3 | + | 0 | 0 |
| | 1 1 | | | | | |
| | 1 1 | | A5 | 0 | 0 | 0 |
| | 0 0 | | A1 | 0 | 0 | 0 |
| | 0 0 | | | | | |
| $I_1, I_2 = 1,0$ (CG2) | 1 0 | | A2 | − | − | − |
| | 0 0 | | | | | |
| | 0 1 | | A2 | − | + | + |
| | 0 0 | | | | | |
| | 1 0 | | A4 | + | − | − |
| | 1 1 | | | | | |
| | 0 1 | | A4 | + | + | + |
| | 1 1 | | | | | |
| $I_1, I_2 = 0,1$ (CG3) | 0 0 | | A2 | + | − | + |
| | 1 0 | | | | | |
| | 0 1 | | A2 | + | + | − |
| | 0 1 | | | | | |
| | 1 1 | | A4 | − | + | − |
| | 0 1 | | | | | |
| | 1 1 | | A4 | − | − | + |
| | 1 0 | | | | | |
| $I_1 I_2 = 1,1$ (CG4) | 1 0 | | A3 | 0 | − | 0 |
| | 1 0 | | | | | |
| | 0 1 | | A3 | 0 | + | 0 |
| | 0 1 | | | | | |
| | 1 0 | | A3 | 0 | 0 | − |
| | 0 1 | | | | | |
| | 0 1 | | A3 | 0 | 0 | + |
| | 1 0 | | | | | |

FIG. 7

| LA1 | LA2 | LA3 | LA4 | LA5 | L+ | L- | L0 | I$_1$ | I$_2$ |
|---|---|---|---|---|---|---|---|---|---|
| 1 | X | X | X | X | X | X | X | 0 | 0 |
| X | X | X | X | 1 | X | X | X | 0 | 0 |
| X | X | 1 | X | X | 1 | X | X | 0 | 0 |
| X | X | 1 | X | X | X | 1 | X | 0 | 0 |
| X | X | 1 | X | X | X | X | X | 1 | 1 |
| X | X | 1 | X | X | X | X | 1 | 1 | 1 |
| X | 1 | X | X | X | X | 1 | X | 1 | 0 |
| X | X | X | 1 | X | 1 | X | X | 1 | 0 |
| X | 1 | X | X | X | 1 | X | X | 0 | 1 |
| X | X | X | 1 | X | X | 1 | X | 0 | 1 |

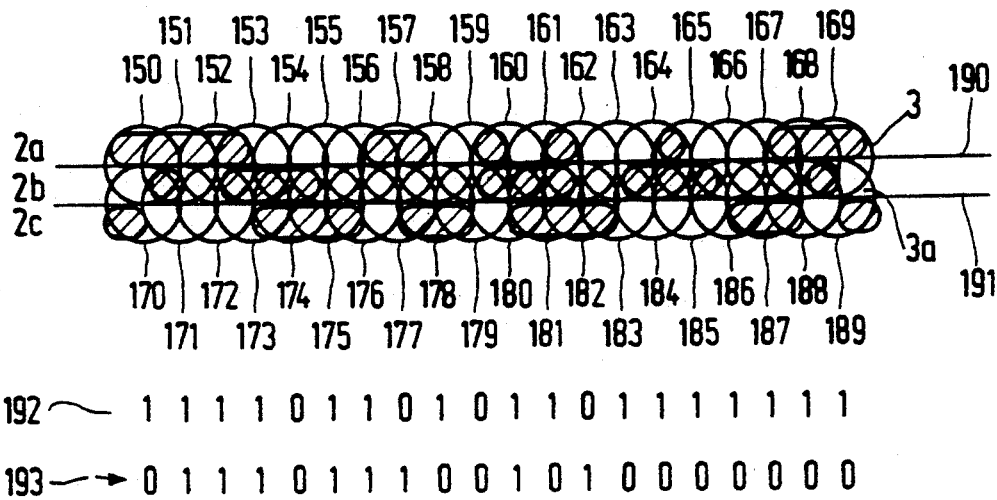
FIG.15
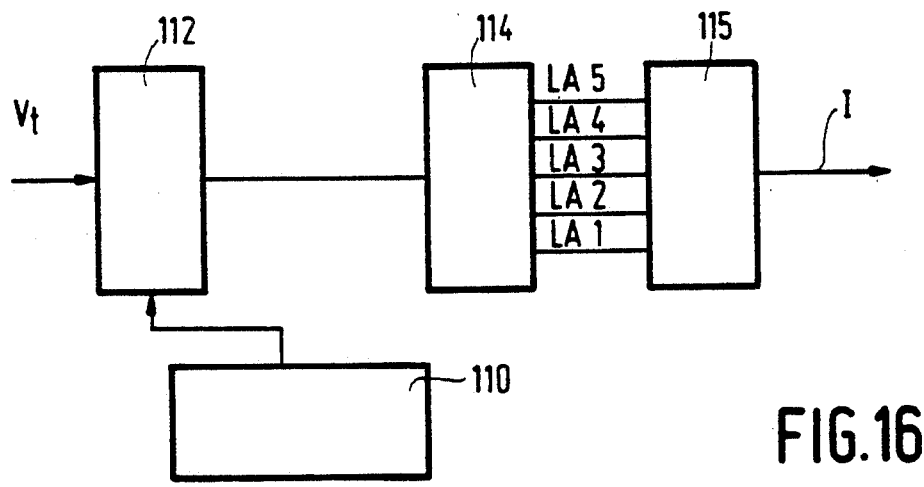
FIG.16
| LA1 | LA2 | LA3 | LA4 | LA5 | I |
| --- | --- | --- | --- | --- | --- |
| 1 | X | X | X | X | 0 |
| X | 1 | X | X | X | 1 |
| X | X | 1 | X | X | 0 |
| X | X | X | 1 | X | 1 |
| X | X | X | X | 1 | 0 |
FIG.17

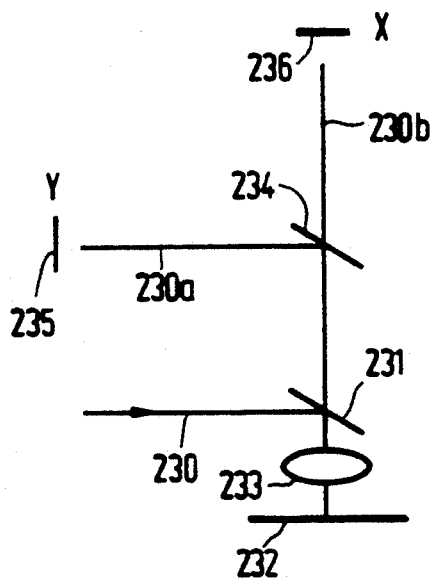
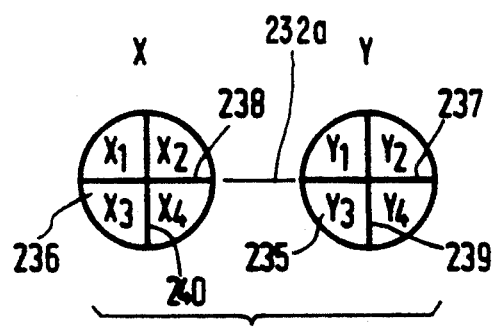
FIG. 20a
FIG. 20b

INFORMATION READING SYSTEM AND RECORD CARRIER AND READING DEVICE FOR USE IN SUCH A SYSTEM

The invention relates to an information reading system comprising an information carrier and a reading device, in which system the information carrier has at least two parallel tracks which, viewed in the track direction, are divided into elementary areas, the boundary positions defining the boundaries between the elementary areas being aligned in a direction transverse to the track direction, while information is recorded in the parallel tracks by means of information patterns which comprise marks and intermediate areas, the transitions between the marks and the intermediate areas substantially coinciding with the boundary positions, the influence of a mark of the radiation of the radiation beam differing from the influence of the intermediate areas on said radiation, the device comprising an optical system for directing a radiation beam onto a detection system via the information pattern, with the radiation beam being modulated in conformity with the information pattern, said optical system comprising means for focusing the radiation beam onto the information pattern, while a scanning spot is formed on the information pattern by the radiation beam, and said detection system being adapted to generate at least one detection signal in dependence upon the modulation of the beam, the device comprising means for scanning the record carrier by means of the scanning spot along a line which is located substantially centrally between said two parallel tracks, the mutual distance between the two parallel tracks being so small that the two parallel tracks are at least partly scanned by the radiation beam, the device comprising signal generation means for recovering the recorded information on the basis of the detection signals.

The invention also relates to a record carrier and reading device for use in the system.

A system as described in the opening paragraph is known from EP-A-0 376 626. In the system disclosed in this document a record carrier is used in which the four possible different patterns, which may be formed by two radially adjacent elementary areas, determine the four possible values of a quadrivalent information unit. An amplitude signal which is indicative of the total intensity of the modulated radiation beam and a radial push-pull signal which is indicative of the intensity difference in two halves of the cross-section of the modulated beam are derived as detection signals. The modulated beam is divided into two parts along a line which corresponds to the track direction. To regain the recorded information, use is made of the signal values of the two detection signals at the instants when the centre of the scanning spot scans the centres of the elementary areas.

It is an object of the invention to provide an information reading system as described in the opening paragraph, with which a higher information density on the record carrier can be obtained.

According to the invention, this object is achieved in that the distribution of marks and intermediate areas across groups of at least two by two elementary areas is indicative of the recorded information, the signal regeneration means being adapted to recover the recorded information from the signal values of the detection signals at the instants when the centre of the scanning spot passes the boundary positions.

In the system according to the invention it is possible to use a very small length of the elementary areas. This results in a very high information density.

An embodiment of the information system according to the invention is characterized in that the tracks are grouped in track pairs of two juxtaposed tracks, each track forming only part of one track pair and each group of two by two elementary areas from a track pair representing a bit combination of two logic bits, the scanning means being adapted to scan the tracks in accordance with scanning paths located substantially in the centre of the track pairs.

A further embodiment is characterized in that the sixteen different information patterns which are possible within the groups of two by two elementary areas are divided into four configuration groups of four different patterns, each configuration group representing one of the four possible bit combinations which are possible with two bits, and two predetermined adjacent elementary areas located in two different tracks forming four different sub-patterns in each configuration group.

This embodiment has the advantage that the information pattern formed by the track pair is extendable in the track direction for any arbitrary series of information bits to be recorded.

In the two last-mentioned embodiments two bits of the information which has been read become available at each sampling instant. This means that the bit rate of the information which has been read is equal to twice the sampling frequency. Moreover, when recording the information two tracks should each time be provided with information patterns.

An embodiment in which the bit rate is lower than that in the last-mentioned two embodiments is characterized in that the information comprises at least three parallel tracks, each group of two by two elementary areas representing one logic bit, the scanning means being adapted to scan the tracks along scanning paths which correspond to the centres between each arbitrary pair of two adjacent parallel tracks.

A further embodiment of the system according to the invention is characterized in that the sixteen different information patterns which are possible within the groups of two by two elementary areas are divided into two configuration groups of eight different patterns each, each configuration group representing one of the two possible logic values of a bit, and three predetermined elementary areas constituting eight different sub-pattern in each configuration group.

In this embodiment the information pattern is extendable in the track direction as well in the direction transverse to the tracks. This has the advantage that only one track needs to be written when information is recorded.

A further embodiment is characterized in that there is an even number of marks in one of the configuration groups and an odd number of marks in the information patterns of the other configuration group.

This embodiment has the advantage that for the purpose of recovery it is sufficient to use only the signal supplied by the amplitude detector.

A further embodiment is characterized in that the record carrier is of a type in which the influence of the marks on the phase of the radiation beam differs from the influence of the intermediate areas on said phase, the detection system comprising an amplitude detector for supplying an amplitude signal whose signal value is indicative of the extent to which the beam is influenced by the pattern of marks and intermediate areas at the location of the scanning spot, and comprising a push-pull detector for deriving a push-pull signal from the intensity distribution across the cross-section of the radiation beam influenced by the information pattern, the signal generation means being adapted to derive the information on the basis of the signal values of the amplitude signal and the push-pull signal at the instants when the centre of the scanning spot passes the boundary positions.

This embodiment is also based on the recognition that in addition to the amplitude signal the different push-pull signals also comprise information about the recorded information pattern. By making use of both types of signals, information patterns having a very high density in the track direction as well as a high track density are readable in a reliable manner. Instead of deriving the read information from the amplitude signal and one or more push-pull signals, it is alternatively possible to regain the information only on the basis of push-pull signals.

A further embodiment of the system according to the invention is characterized in that the record carrier is of a magneto-optical type, the detection system comprising a polarizing beam splitter for splitting the modulated radiation beam into a first sub-beam of radiation having a first direction of polarization and a second sub-beam of radiation having a second direction of polarization which is substantially perpendicular to the first direction of polarization, each push-pull detector comprising a first difference detector for detecting intensity differences in the first sub-beam and a second difference detector for detecting intensity differences in the second sub-beam.

By using difference detection, the influence of noise on the push-pull signals is considerably reduced.

An embodiment of the system is characterized in that the information patterns in the two parallel tracks have periodical interruptions incorporating optically detectable control patterns which define the position of an imaginary line located centrally between the two parallel tracks, the device comprising means for deriving control signals for controlling the scanning of the parallel tracks on the basis of the detection signals generated by sub-detectors during scanning of the control patterns.

In this embodiment the derivation of the control signals during scanning is not influenced by the information patterns. This has the advantage that it is not necessary to impose additional requirements on the coding of the recorded information.

Figure 1A:
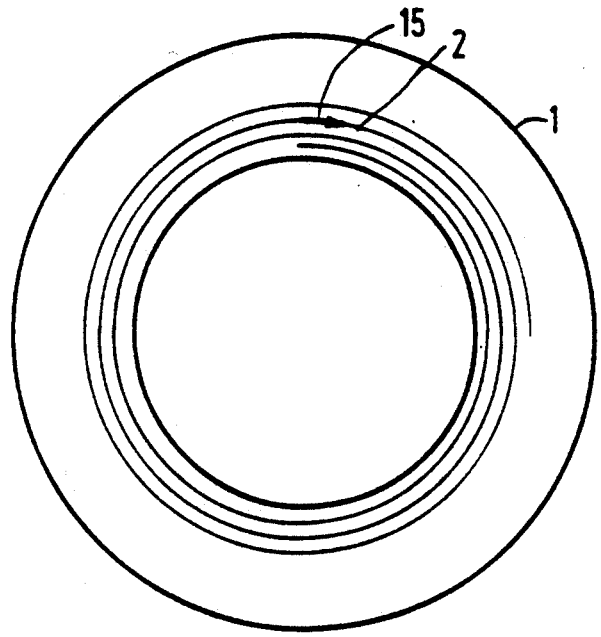
Figure 1C:
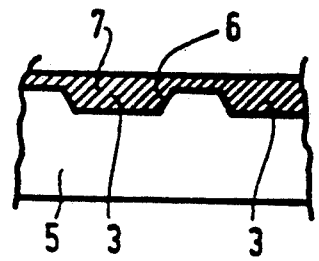
Figure 2:
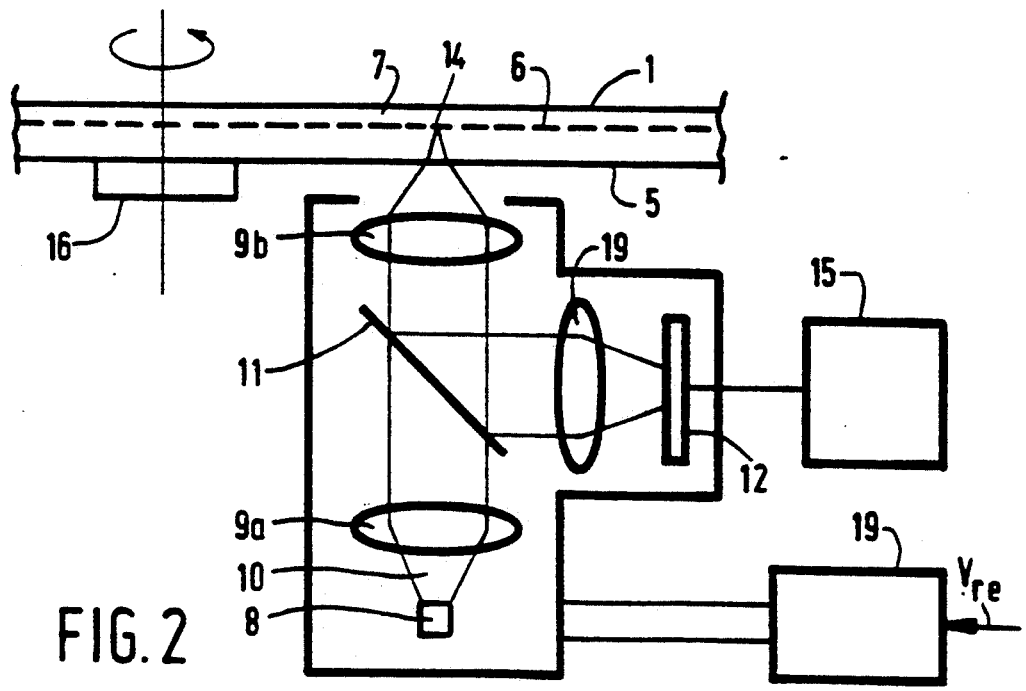
Figure 5:
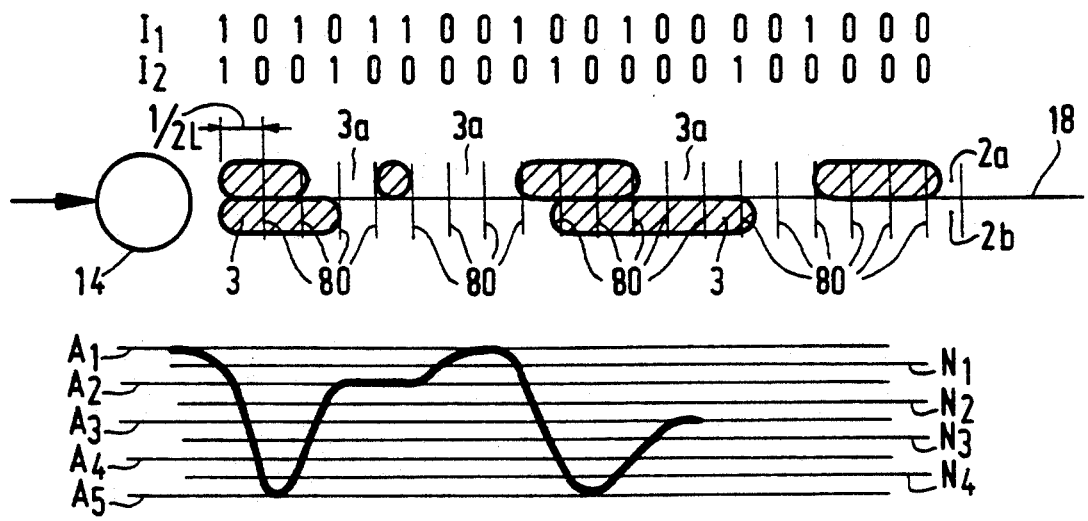
Figures 8, 9:
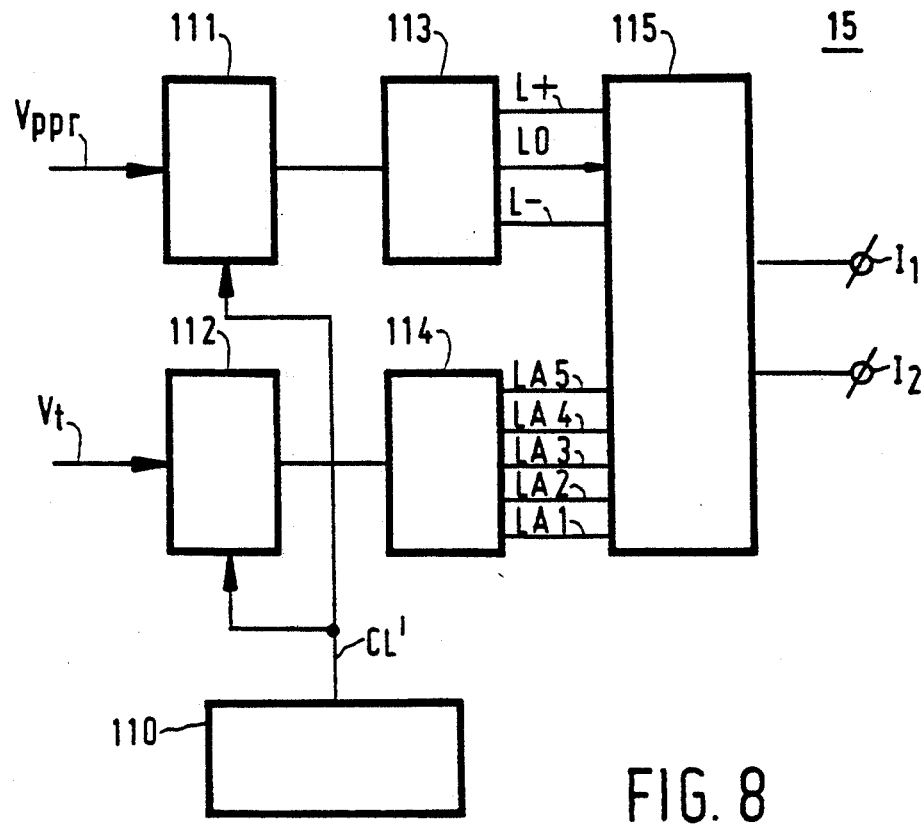
Figure 10:
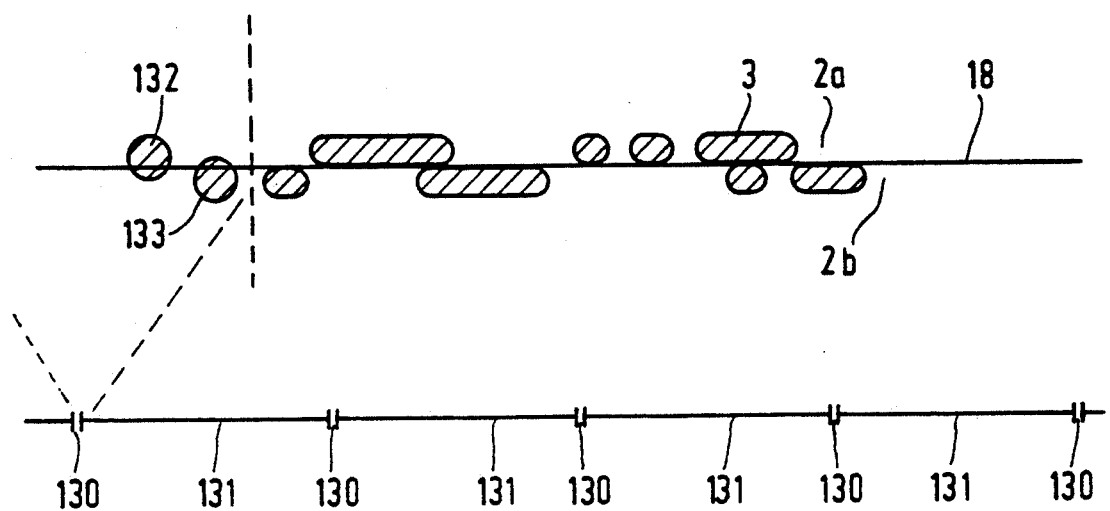
Figure 11:
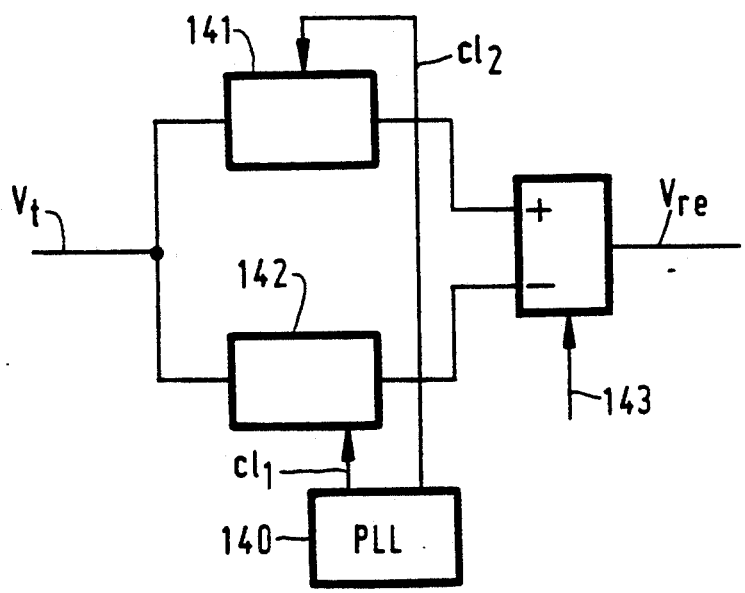

Further embodiments and their advantages will hereinafter be described in greater detail with reference to the FIGS. 1 to 20 in which FIG. 1a is a plan view of the record carrier, FIG. 1b shows a portion of this plan view on a highly enlarged scale, and FIG. 1c is a cross-section of this enlarged portion, FIG. 2 shows an embodiment of an information reading system according to the invention, FIGS. 3a, 3b, 3c and 3d show the relationship between the position of a mark in the scanning spot and the power distribution within the radiation spot produced by the modulated radiation beam on the detection system, FIG. 4 shows an embodiment of a detection system, FIG. 5 shows an embodiment of a suitable information pattern for use on the record carrier according to the invention, FIGS. 6a, . . . , 6g show examples of information patterns which can be covered by the scanning spot during scanning, FIG. 7 shows a relationship between information patterns which are covered by the scanning spot, and a plurality of signals defined thereby, FIG. 8 shows an embodiment of a signal regeneration circuit, FIG. 9 shows a truth table to elucidate the function of the logic circuit in the signal regeneration circuit, FIG. 10 shows an embodiment of a control pattern based on which a tracking error can be derived and FIG. 11 shows an embodiment for deriving a tracking error signal based on the control patterns.

Figure 18:
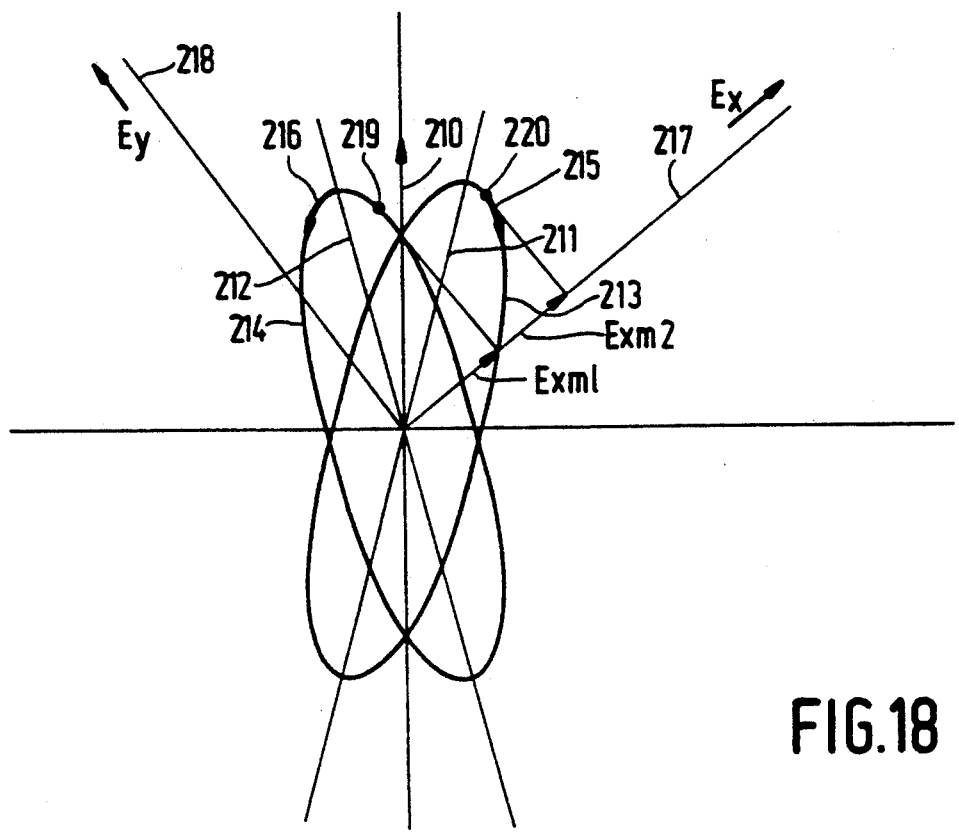
Figure 19:
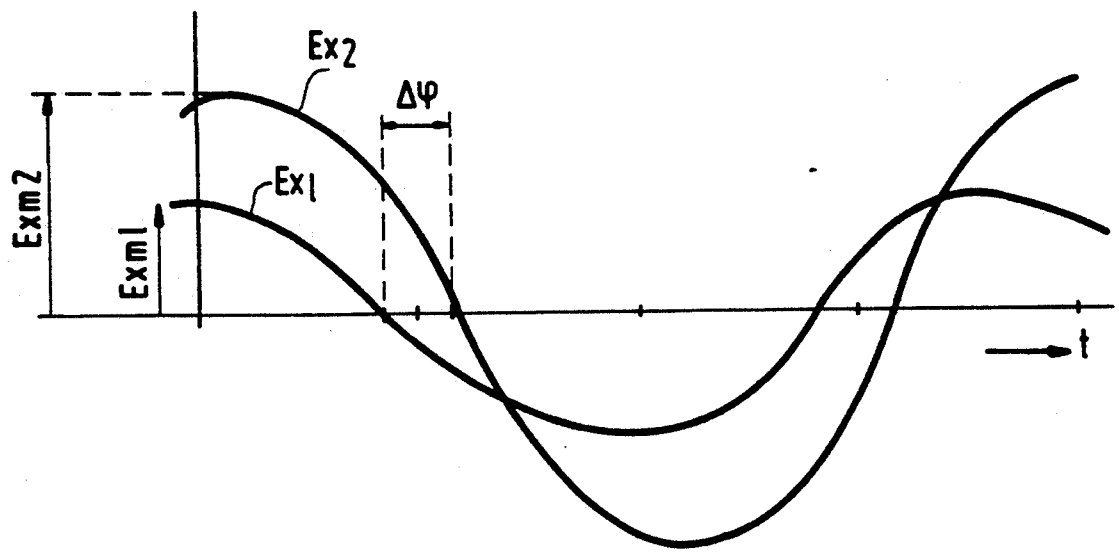

FIGS. 12, 13, 14 and 15 show information patterns to illustrate different embodiments of the system according to the invention, FIG. 16 shows a circuit for deriving the recorded information, FIG. 17 shows a function diagram to illustrate the function performed in the circuit of FIG. 16, FIG. 18 shows the influence of a magneto-optical layer on the polarization of incident radiation, FIG. 19 shows the influence of a magneto-optical layer on the phase of the detected radiation, and FIGS. 20a and 20b show a detection system for detecting push-pull signals when magneto-optical recording layers are scanned.

FIG. 1a is a plan view of a record carrier 1 for use in the information reading system according to the invention. The record carrier 1 comprises parallel tracks which are substantially concentrical to each other in this embodiment. FIG. 1b shows on a highly enlarged scale a portion of the plan view of the record carrier incorporating two juxtaposed tracks 2a and 2b. Both tracks comprise elementary areas of constant length (0.5 L) and a width corresponding to the width (B) of a track. The boundaries between the elementary areas are denoted by reference numeral 80. These boundaries will hereinafter be referred to as boundary positions. The boundary positions of the parallel tracks are aligned in a direction transverse to the tracks 2a and 2b. A plurality of the elementary areas is occupied by marks which are denoted by reference numerals 3. The reference numeral 3a denotes the areas between the marks 3. These areas will hereinafter be referred to as intermediate areas. The marks have been provided in such a way that the transitions between intermediate areas 3a and marks 3, viewed in the track direction, substantially coincide with the boundary positions 80. The recorded information is defined by the pattern of marks 3 and intermediate areas 3a. The marks 3 are of a type whose influence on, for example, the phase of reflected or transmitted radiation differs from the influence of the intermediate areas 3a on the phase of reflected or transmitted radiation. Such marks may be pits in a reflecting surface. FIG. 1c shows by way of example a cross-section of the record carrier for the case where the marks 3 are pits. The pit-shaped marks in FIG. 1c are provided in a transparent substrate 5 on which a reflecting layer 6 is provided. The reflecting layer 6 may be coated by means of a protective coating 7.

FIG. 2 shows a reading device for use in the information reading system according to the invention. The device comprises a radiation source 8, for example, a semiconductor laser for generating a radiation beam 10 which is projected onto the reflecting layer 6 by means of a lens system 9a, 9b. The radiation beam is focused to a small scanning spot on the layer 6 by means of an objective 9b of the lens system in FIG. 1b the scanning spot is shown diagrammatically, denoted by reference numeral 14. It is to be noted that actually the scanning spot does not have a sharp boundary as is shown in FIG. 1b. For example, the intensity of a scanning spot obtained with a homogeneous pupil filling of the focusing objective has an intensity variation which is known as the Airy profile. The diameter of such a scanning spot in accordance with the FWHM criterion (FWHM=Full-Width-Half-Maximum) is approximately equal to 0.5 $\lambda$/NA in which $\lambda$ is the wavelength of the radiation and NA is the numerical aperture of the focusing objective 9b. The focusing objectives used in practice have a numerical aperture of approximately 0.5 so that the diameter of the scanning spot is then approximately equal to the wavelength of the radiation. The distance ($\Delta M$) between the tracks 2a and 2b is chosen to be so small that the two tracks are at least partly scanned when the scanning spot is used for a scanning operation in which the centre follows a line 18 which is located centrally between the tracks. The record carrier 1 is rotated about its shaft by means of a driving system 16, with the centre 17 of the scanning spot 14 being substantially directed onto the line 18. Thus, the information patterns in the two tracks 2a and 2b are simultaneously scanned in a direction shown by way of an arrow 15. The radiation reflected by the information patterns is projected onto a radiation-sensitive detection system 12 by means of objective 9b and a beam splitter 11, for example a partially transparent mirror, and a lens 19. The intensity of the reflective radiation beam is modulated as a result of the information patterns at the location of the scanning spot 14. Since the marks 3 have a different influence on the phase of the radiation as compared with the intermediate areas 3a, the intensity distribution across the cross-section of the radiation beam is dependent on the pattern of occupied and unoccupied elementary areas covered by the scanning spot.

For a detailed description of the dependence of the intensity distribution across the cross-section of the beam reference is made to the book "Principles of Optical Disc Systems" pp. 17 to 23.

The effect of the position of a mark on the intensity distribution in the reflected radiation beam is illustrated in FIGS. 3a and 3b.

FIG. 3a shows a mark 3 which is located asymmetrically with respect to a line 30 through the centre of the scanning spot 14. The reference numeral 31 denotes a radiation spot which is produced by the modulated radiation beam on a detection surface of the detection system 12. The circumference of the radiation spot 31 is defined, inter alia, by the dimensions of the pupil of the focusing objective 9b. The line 30 in the scanning spot 14 on the record carrier 1 corresponds to a line 32 through the centre 35 in the radiation spot 31 on the detection surface of the detection system. The direction of line 32 corresponds to the scanning direction which is denoted by the arrow 15. A line 33 through the centre 17 of the scanning spot 14 and perpendicular to the line 30 corresponds to a line 34 through the centre of the radiation spot 31 perpendicular to the line 32. The direction of line 34 corresponds to a direction transverse to the scanning direction. The direction of line 33 is referred to as radial direction. The mark 3 located asymmetrically with respect to the line 30 in the scanning spot 14 results in a difference between the received radiation power in the portions 31a and 31b of the radiation spot 31, which portions are defined by the line 32. This difference decreases as the position of the mark 3 moves further towards the centre of the scanning spot 14, until the difference is equal to zero, with a symmetrical location of the mark 3 with respect to the line 30. With a further move of the mark 3 a difference is created between the received power in the portions 31a and 31b, while the difference has a sign opposed to that of the difference when the mark 3 is located above the line 30.

FIG. 3b shows a mark which is located asymmetrically with respect to the line 33. Such an asymmetrical location results in a difference in the received radiation power in the portions 31c and 31d in the radiation spot 31, which portions are defined by bounding line 34. When the mark 3 is located symmetrically, this difference is equal to zero, while the difference has a reversed sign when the mark 3 is located to the left of the line 33.

FIG. 4 shows the radiation-sensitive detection surface of the detection system 12. The detection surface is divided along the lines 32 and 34 into four sub-areas 13a, 13b, 13c and 13d each covering the radiation-sensitive area of a sub-detector. The detection system 12 supplies four signals Va, Vb, Vc and Vd. The signals Va, Vb, Vc and Vd are measures of radiation powers received by the sub-areas 13a, 13b, 13c, 13d.

A circuit 40 derives a signal Vppr from the signals Va, ..., Vd, which signal is indicative of the value of (Va+Vb)−(Vc+Vd). The signal Vppr will hereinafter be referred to as the radial push-pull signal. A circuit 41 derives a signal Vppt from the signals Va, ..., Vd, which signal is indicative of the value of (Va+Vc)−(Vb+Vd). The signal Vppt will hereinafter be referred to as the tangential push-pull signal. A circuit 42 derives a signal Vppd from the signals Va, ..., Vd, which signal is indicative of the value of (Va+Vd)−(Vb+Vc). The signal Vppd will hereinafter be referred to as the diagonal push-pull signal. A circuit 43 derives a signal Vt from the signals Va, ..., Vd, which signal is indicative of Va+Vb+Vc+Vd. This signal Vt will hereinafter be referred to as the amplitude signal. The sub-detectors 13a, 13b, 13c and 13d together with a circuit 43 constitute an amplitude detector which supplies the amplitude signal Vt as an output signal which is indicative of the extent to which the radiation beam is influenced by the portion of the information patterns scanned by the scanning spot 14. The sub-detectors 13a, 13b, 13c and 13d together with a circuit 40 constitute a radical push-pull detector with which a difference in intensity distribution is detected within the cross-section of the radiation beam in a direction corresponding to the radial direction on the record carrier at the location of the scanning spot 14. The sub-detectors 13a, 13b, 13c and 13d together with a circuit 41 constitute a tangential push-pull detector with which a difference in intensity distribution is detected in a beam in a direction corresponding to the track direction, also referred to as tangential direction. The sub-detectors 13a, 13b, 13c and 13d together with a circuit 42 constitute a diagonal push-pull detector with which the difference between the intensity distributions in two diagonal directions is determined.

Referring to FIG. 5, it will hereinafter be elucidated in which way the recorded information can be represented by the pattern of marks 3 and intermediate areas 3a in an embodiment of the record carrier according to the invention. In FIG. 5 the pattern in track 2a represents a series of bits I1 in which a logic value "1" for I1 is indicated by a transition, coinciding with a boundary position, between a mark 3 and an intermediate area 3a. A logic value "0" is indicated by a boundary position 80 without a transition between a mark 3 and an intermediate area 3a. Similarly, the information pattern in track 2b represents the logic value of a series of bits I2.

The bits I1 and I2 can be read simultaneously by determining the values of the signal Vt and at least one of the push-pull signals Vppr, Vppt or Vppd at the instants when the centre 17 of the scanning spot coincides with the boundary positions 80 while the scanning spot is scanning the tracks 2a and 2b along line 18. The amplitude signal Vt is also shown in FIG. 8 as a function of the scanning position. As is shown in FIG. 8, the amplitude signal Vt may assume five different values when passing the boundary positions 80, dependent on the surface area which is occupied by the marks 3 within the scanning spot 14.

FIG. 6 shows a number of different possible patterns which may occur within the scanning spot due to the use of the marks 3. In these Figures the centre 17 of the scanning spot 14 is always located on the line centrally between the tracks 2a and 2b at the location of a boundary position 80 between the elementary areas so that the scanning spot 14 each time covers four elementary areas.

Figure 6A:
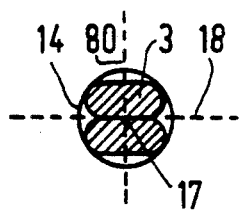

FIG. 6a shows a pattern in which all four elementary areas covered by the scanning spot are occupied by a mark 3. This means that the amplitude signal Vt assumes a minimum value A5 (see FIG. 8). All push-pull signals Vppr, Vppt and Vppd are zero.

Figure 6B:
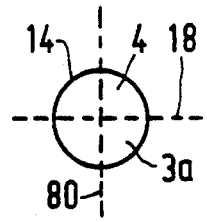

FIG. 6b shows a pattern without any mark 3. This means that the amplitude signal Vt assumes a maximum value A1. All push-pull signals Vppr, Vppt and Vppd are zero.

Figure 6C:
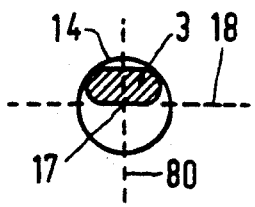
Figure 6D:
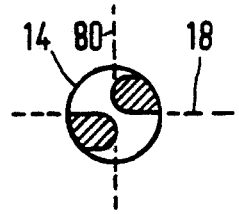
Figure 6E:
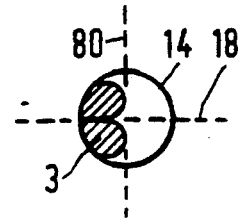

FIGS. 6c, 6d and 6e form a pattern in which two of the four elementary areas covered by the scanning spot 14 are occupied by a mark 3. This means that the amplitude signal Vt assumes a value A3 substantially centrally between the values A1 and A5.

In FIG. 6c the two occupied elementary areas are located at the same side of the line 18 indicating the centre between the tracks. This means that the radial push-pull signal assumes a value deviating from zero, while the signals Vppt and Vppd are equal to zero.

In FIG. 6d the occupied elementary areas are located diagonally with respect to each other. This means that the diagonal push-pull signal Vppd is unequal to zero, while the tangential (Vppt) and the radial push-pull signal Vppr are both equal to zero.

In FIG. 6e the two occupied elementary areas are located at the same side of the boundary position 80. This means that the tangential push-pull signal Vppt is unequal to zero, while the diagonal (Vppd) and the radial push-pull signal Vppr are equal to zero.

Figure 6F:
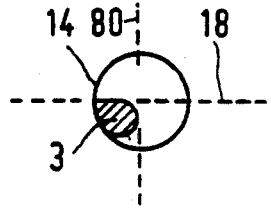

FIG. 6f shows a pattern in which only one elementary area of the four elementary areas is occupied by a mark 3. This means that the amplitude signal assumes a value A2 substantially centrally between the values A1 and A3. The radial (Vppr), tangential (Vppt) and diagonal push-pull signal Vppd are all unequal to zero.

Figure 6G:
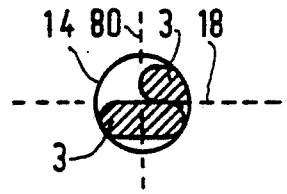

FIG. 6g shows a pattern in which three of the four elementary areas are occupied by marks 3. This means that the amplitude signal Vt assumes a value A4 substantially centrally between the values A3 and A5. The radial (Vppr), tangential (Vppt) and diagonal push-pull signal Vppd are all unequal to zero.

FIG. 7 shows a survey of the sixteen different patterns which may be formed by four elementary areas. These patterns will hereinafter be referred to as code symbols. The patterns are grouped in configuration groups CG1, CG2, CG3 and CG4. All patterns in one and the same configuration group represent a bit combination I1, I2 having identical logic values. In addition to the code symbols, FIG. 7 also shows the associated values of the amplitude signal Vt and the sign of the three push-pull signals. Based on the amplitude signal Vt in combination with one or more of the push-pull signals, it can be unambiguously deduced which of the four possible bit combinations I1, I2 are represented by the scanned code symbol. For example, the amplitude signal Vt and the radial push-pull signal unambiguously define the four possible bit combinations. The amplitude signal Vt and the push-pull signals Vppt and Vppd also define these bit combinations. To determine the logic values of bit combinations I1, I2, the amplitude signal is not required. In fact, all possible bit combinations I1, I2 are also defined by the three push-pull signals Vppr, Vppt and Vppd.

As is apparent from the Table, there is a unique combination of signal values of the signals Vppr, Vppt and Vppd for each combination of I1, I2. In the code symbols shown in FIGS. 6 and 7 a logic "1" is represented by a transition between marks 3 and intermediate areas in the track direction. However, it is alternatively possible for a logic 1-bit to be represented by a transition between a mark 3 and intermediate areas in a direction transverse to the tracks. In that case other combinations of the signals Vt, Vppr, Vppt and Vppd can be used for deriving the information. For example, the amplitude signal Vt and the tangential push-pull signal Vppt can be used for this derivation.

FIG. 8 shows an embodiment of a regeneration circuit 15 for deriving the logic value of the information bits I1, I2 from the signals Vppr and Vt which become available when the information pattern shown in FIG. 5 is scanned. The regeneration circuit comprises a clock generation circuit 110 for generating a clock signal cl' which is indicative of the instants when the centre 17 of the scanning spot 14 passes the boundary positions 80. This clock signal cl' controls a first sampling circuit 111 and a second sampling circuit 112 for taking samples of the signals Vppr and Vt, respectively, at the instants when the centre 17 of the scanning spot 14 passes the boundary positions 80. The samples of the signal Vppr are applied to a threshold circuit 113 which compares the signal values of the samples with predetermined threshold values. The threshold circuit 113 provides three logic signals L+, L− and Lo indicating whether the signal value of the sample Vppr is distinctly positive, distincly negative or substantially equal to zero. The samples of the amplitude signal Vt are applied to a threshold circuit 114 which compares the values of the sample with four threshold values N1, N2, N3 and N4 as shown in FIG. 8. The threshold circuit 114 indicates by means of logic signals which of the five signals defined by the four threshold values N1, . . . , N4 incorporates the sample value of the amplitude signal Vt. In principle a three-bit logic signal may be sufficient to indicate this. In the embodiment shown the threshold circuit generates five signals LA1, LA2, LA3, LA4 and LA5 which indicate whether the signal value of the samples of Vt is above the threshold N1, between the threshold N1 and N2, between the thresholds N2 and N3, between the thresholds N3 and N4 or below the threshold N4, respectively. A logic circuit 115 derives the logic values of the information bits I1 and I2 from the logic values L+, Lo, L− and LA1, . . . , LA5 in conformity with the relations which are shown in the truth table of FIG. 9. The symbols X in FIG. 9 denote what are called "don't cares".

For controlling the scanning, it is common practice to derive control signals from the intensities detected by the sub-detectors. Such control signals are, inter alia, a tracking control signal for keeping the scanning spot directed onto the line 18, a focus control signal for keeping the scanning beam focused on the reflecting layer 6 and a clock signal indicating the instants when the boundary positions 80 between the elementary areas are passed. The afore-mentioned control signals can be derived from the intensities which are detected by the sub-detectors when the information patterns are being scanned.

For example, to keep the scanning spot 14 directed onto the line 18, the low-frequency component of the radial push-pull signal Vppr can be used. However, it is then desirable that both patterns in the tracks 2a and 2b represent a signal which is free from a dc current. This is desirable to prevent an unwanted influence on the derivation of the tracking control signal by the information pattern. This means that in the case of recording the information to be recorded must be subjected to an additional coding.

The control signals are preferably derived on the basis of control patterns which alternate with the information patterns because additional restrictions need not be imposed on the coding for the purpose of tracking.

FIG. 10 shows an embodiment of suitable control patterns. Areas in which control patterns are provided are denoted by reference numeral 130 and areas having two parallel tracks with information patterns are denoted by reference numeral 131 in these Figures. For deriving the tracking error signal, the control pattern has two optically detectable marks 132 and 133 which are slightly offset with respect to the line 18 at both sides of this line 18.

FIG. 11 shows an embodiment of a circuit for deriving the tracking control signal Vre on the basis of the influence exerted by the marks 132 and 133 on the amplitude signal Vt. The circuit comprises a clock signal generator 140 for generating a clock signal c11 and c12 indicating the instants when the scanning spot passes the marks 132 and 133, respectively. These clock signals can be derived by means of conventional phase-locked loop techniques from the influence of synchronizing marks in the control patterns on the amplitude signal Vt.

The circuit of FIG. 11 further comprises two sample-and-hold circuits 141 and 142 controlled by the clock signals c11 and c12 for sampling and holding the signal value of the amplitude signal Vt at the instants when mark 132 and mark 133, respectively, are passed by the scanning spot 14. The difference between the samples obtained by means of the circuits 141 and 142 is determined with the aid of a differential circuit 143.

A signal indicating this difference can be obtained from the output of the circuit 143. This signal functions as the tracking control signal Vre. The derivation of the tracking control signal on the basis of control patterns has been described only roughly hereinbefore. For a more detailed description of the derivation of the control signals on the basis of control patterns provided for this purpose reference is made to, inter alia, Patent Specifications EP-A-0,257,703; U.S. Pat. No. 4,669,077; U.S. Pat. No. 4,561,082; U.S. Pat. No. 4,707,816; U.S. Pat. No. 4,443,870, which Patents are herein incorporated by reference.

In the afore-described system according to the invention the distance between the parallel tracks is always such that a scanning spot can simultaneously scan two tracks. For an optimum information density in the radial direction it is desirable that the width between the tracks is as small as possible. In the system according to the invention not only a high information density in the radial direction but also a high information density in the track direction is obtained because very small lengths of the elementary areas still provide a considerably reliable read-out. Thus, all this yields a very high information density on the record carrier.

In the foregoing description the invention has been illustrated with reference to a record carrier having concentrical tracks read in reflection. It will be evident to those skilled in the art that the invention is equally applicable to record carriers which must be read in transmission, or for record carriers having straight tracks instead of concentrical or spiral tracks. Finally it is to be noted that the use of the invention is not limited to embodiments comprising a detection system as described hereinbefore. It will be evident to those skilled in the art that the push-pull signals Vppr, Vppd and Vppt may alternatively be derived by means of other types of detection systems. For example, for deriving the radial push-pull signal any detection system of a type already used for generating the push-pull signals for the tracking is suitable.

Figure 12:
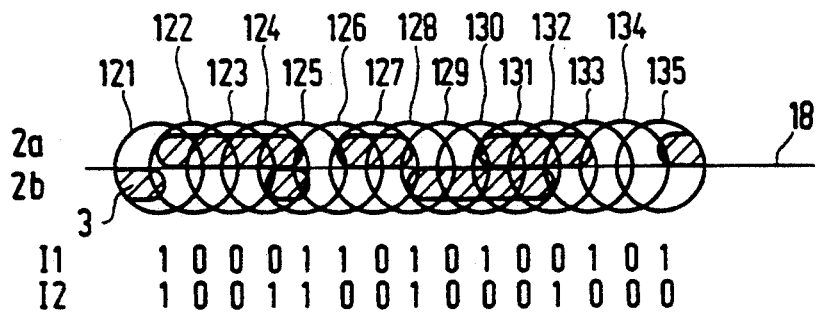

In the recording operation as described hereinbefore two bits I1, I2 are represented by the division of marks 3 and intermediate areas 3a within a code symbol. As is shown in FIG. 7, sixteen different code symbols are possible. The sixteen different code symbols may be indicated by a two-dimensional code word Sc as is shown in FIG. 7. The separate bits of the 2-by-2 bit code word Sc are denoted by C1, C2, C3 and C4, respectively. The information patterns in FIG. 7 are divided into four configuration groups CG1, CG2, CG3 and CG4. The configuration group CG1 comprises all code symbols which represent a bit combination I1, I2=0, 0. Each configuration group CG2, CG3 and CG4 comprises four code symbols so that the four possible bit combinations I1, I2=0, 0; I1, I2=1, 0; I1, I2=0, 1 and I1, I2=1, 1 are represented. Each pattern on two radially juxtaposed elementary areas in the tracks 2a and 2b forms a sub-pattern for two successive code symbols. The sub-patterns within a code symbol which also forms part of a previous code symbol will be referred to as symbol overlap. For the afore-described code symbols the symbol overlap corresponds to the code bits C1 and C3. In each configuration group the four different bit combinations 00, 10, 02 and 11 occur as values for the code bits C1, C3. This means that there is an associated information pattern for each arbitrary series of bit combinations I1, I2. In FIG. 12 the bit combination I1, I2=0, 0 is represented by the different code symbols which are located within the circles 122, 129, 131 and 134.

Figure 13:
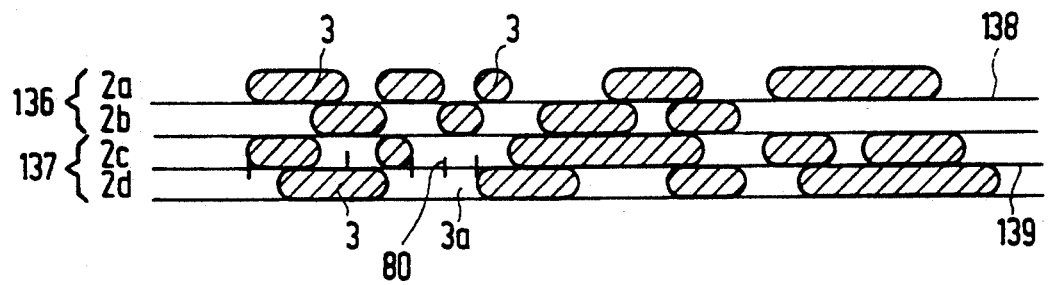

In the afore-described code symbols each representing the values of the two bits of the bit combination I1, I2 the information pattern formed by the two parallel tracks is extendable in one direction. This means that an information pattern consisting of overlapping code symbols each representing two bits can be created in one direction (the track direction). When recording information, the information pattern in a track pair comprising two associated parallel tracks is extended. Since the information pattern is extendable in the track direction only, and thus not in the direction transverse to the tracks, each track can only form part of one track pair. To illustrate this, FIG. 13 shows two track pairs. These track pairs are denoted by the reference numerals 136 and 137. The track pair 136 comprises the tracks 2a and 2b, while the track pair 137 comprises the tracks 2c and 2d. When the information recorded in the track pairs is being read, the track pairs are scanned along the lines 138 and 139. On passing each boundary position 80, two bits of the bit combination I1, I2 become available. This means that the bit rate of the information which has been read is equal to twice the sampling frequency for sampling the signal values of the detection signal upon passing the boundary positions 80.

Figure 14:
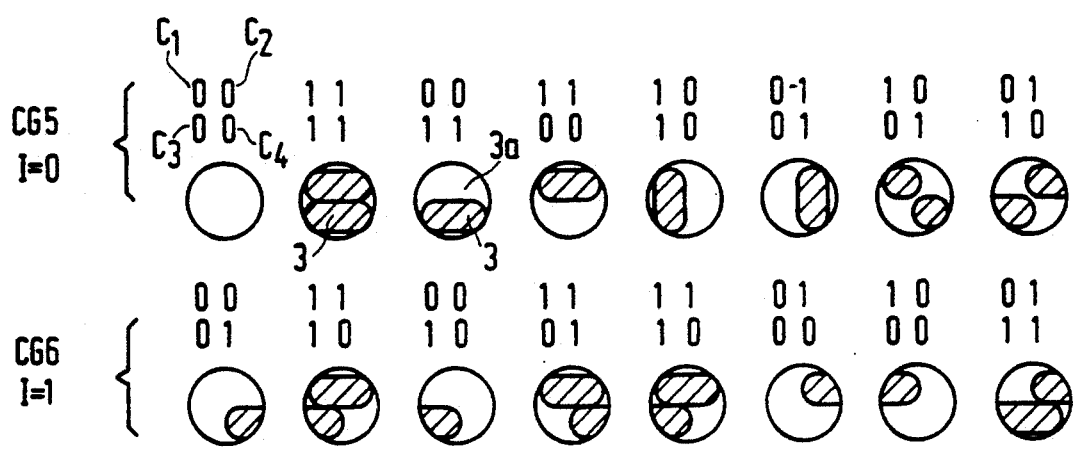

Instead of information patterns which are unidirectionally extendable, there are also code symbols each representing only one bit with which information patterns can be created which are extendable in the track direction as well as in a direction transverse to the track direction. This means that the information pattern comprises code symbols which overlap each other in the track direction as well as in the direction transverse to the tracks. The sixteen code symbols of FIG. 7 can then be divided into two configuration groups CG5 and CG6 as is shown, for example, in FIG. 14. FIG. 14 also shows the associated two-dimensional code words. The configuration group CG5 comprises 8 code symbols each representing a bit of the logic value I=0. The configuration group CG6 comprises the code symbols each representing a bit of the logic value I=1. The code symbols are distributed across the configuration groups in such a way that all possible eight different information patterns occur within each configuration group at three predetermined elementary areas. In FIG. 14 this is the pattern which corresponds to the bits C1, C2 and C3 of the two-dimensional code words CW. Due to this measure information patterns can be formed from code symbols overlapping each other in two directions and each representing a bit of the recorded information. FIG. 15 shows such an information pattern. The information pattern is formed by three tracks 2a, 2b and 2c. Code symbols constituting the information pattern are shown in the circles 150, ..., 189. Each code symbol represents a bit of the recorded information. The information can be read by scanning the information pattern along the lines 190 and 191 indicating the centers between the track pair formed by the tracks 2a and 2b and the track pair formed by the tracks 2b and 2c, respectively.

In the employed division into configuration groups, as shown in FIG. 14, the bits of the recorded signal can only be derived on the basis of the amplitude signal Vt. In this division the number of elementary areas of the information pattern occupied by a mark 3 is always even for configuration groups CG5 and always odd for the configuration group CG6. This means that the logic value of the recorded signal can be recovered on the basis of the amplitude of the amplitude signal Vt. In fact, for the code symbols from the configuration group CG5 the amplitude of the amplitude signal Vt always assumes one of the values A1, A3 or A5. For the code symbols from the configuration group CG6 the amplitude of the signal Vt always assumes one of the values A2 or A4. The recorded information can thus be read by means of amplitude detection.

FIG. 16 shows an adapted embodiment of the circuit of FIG. 8 with which the recorded information can be derived from the amplitude signal Vt. In FIG. 16 the components which are identical to the components of FIG. 8 have identical reference numerals. The embodiment of FIG. 16 comprises an adapted logic circuit 115' which derives the logic value of the read bits I from the signals LA1, ..., LA5 in accordance with the function Table shown in FIG. 17.

The advantage of deriving the recorded information on the basis of the signal Vt only is that information patterns can also be used which are composed of marks having no or hardly any influence on the phase of the radiation, thus for which no push-pull signals can be derived. The recovery of the information on the basis of the amplitude signal only has been described hereinbefore. It is to be noted that the detection may also be carried out on the basis of one of the push-pull signals Vppr, Vppd or Vppt when using the code symbols shown in FIG. 14. In fact, as in the amplitude signal, five different signal levels can be distinguished in the push-pull signal. The code symbols from configuration group CG5 always correspond to the highest, lowest or central signal level.

The code symbols from the configuration group CG6 correspond to one of the two other signal levels, viz, the signal levels between the central signal level and one of the extreme (highest or lowest) signal levels.

An information pattern in the form of a pattern of pits has been described with reference to the embodiment described hereinbefore. Such a pattern of pits influences the phase of the return radiation so that the derivation of push-pull signals will become possible. It is to be noted that the direction of magnetization of the magnetic domains in magneto-optical materials also influences the phase of the radiation. For an explanation of this phenomenon, reference is made to the article in Applied Optics, Vol. 30, No. 2, Jan. 20 1991, pp. 232–252 and Conference Paper "Edge detection for magneto-optical data storage" by Robert T. Lynch and Marc D. Levenson of the IBM Research Division. The influence of the direction of magnetization will hereinafter be briefly explained for the purpose of illustration, while referring to FIG. 18. In this Figure the E vector 210 indicates the direction of polarization of linearly polarized electromagnetic radiation. If this radiation is directed onto a magneto-optical layer, the light returning from the magneto-optical layer has a rotated direction of polarization and an ellipticity of the polarization which are both dependent on the direction of magnetization. The elliptical paths of the ends of the E vectors 211 and 212 of the return radiation for the two different directions of magnetization are denoted by the ellipses 213 and 214. The direction of rotation of the polarization vectors 211 and 212 are opposed, which is illustrated by means of the arrows 215 and 216. When detecting the influence of magnetization of the information layer on the return radiation, a return radiation beam is usually split by means of a polarizing beam splitter into two linearly polarized sub-beams having two directions of polarization which are perpendicular to each other. In FIG. 18 these directions of polarization are denoted by means of the axes 217 and 218.

The component of the return radiation in the X direction indicated by axis 217 is denoted by Ex. The component of the return radiation in the Y direction indicated by axis 218 is denoted by Ey. The magnetization of the information layer has an influence, determined by the direction of magnetization, on the amplitude of the components Ex and Ey. FIG. 18 shows the maximum values of the Ex components by means of the references Exmr and Exml for the radiation corresponding to the ellipses 213 and 214.

In addition to the amplitude, the phase of the radiation components Ex and Ey is also influenced. To illustrate this, FIG. 19 shows the radiation of the components in the X direction as a function of time t, in which Exl denotes the amplitude of the E vector of the radiation corresponding to ellipse 213 and Exr denotes the amplitude of the E vector of the radiation corresponding to ellipse 213. Due to the ellipticity of the polarization, the components Exr and Exl reach their maximum value at different instants. To illustrate this, the point in the ellipse 214 which corresponds to the instant when Exl reaches its maximum is denoted by reference numeral 219. The point at which Exr reaches its maximum is denoted by reference numeral 220 in the ellipse 213. This time interval implies a phase difference $\Delta\phi$ as is shown in FIG. 19. If the return beam is split by means of a polarizing beam splitter into two sub-beams having directions of polarization which correspond to the x and y directions, this phase difference results in a destructive interference in these sub-beams. This results in an inhomogeneous distribution of the radiation energy across the cross-section of the sub-beams in the case of an inhomogeneous distribution of the magnetization within the scanning spot of the scanning radiation beam. Push-pull signals can be derived therefrom by means of the conventional push-pull detectors. When detecting the component only in the X direction or only in the Y direction, the signal-to-noise ratio is very poor, which renders a reliable detection substantially impossible. Therefore it is preferred to detect a radiation component in the X direction as well as in the Y direction and to derive the required detection signals from the difference.

FIGS. 20a and 20b show a suitable embodiment of a device suitable for such a detection. The reference numeral 230 denotes a beam of linearly polarized light. The radiation beam 230 is directed onto a record carrier 232 of a magneto-optical type. The beam is focused by an objective 233 to a small scanning spot on the information layer of the record carrier. The reflective radiation beam is modulated at the location of the scanning spot in accordance with the pattern of magnetic domains. The reflected beam is passed to a polarizing beam splitter 234 via a non-polarizing beam splitter 231. The reflected beam is separated by the polarizing beam splitter 234 into two sub-beams 230a and 230b each representing a component of linearly polarized light with mutually perpendicular directions of polarization.

The sub-beams 230a and 230b are directed onto two push-pull detectors 235 and 236. These push-pull detectors 235 and 236 may be, for example, split detectors whose radiation-sensitive surface is split up into two or four parts along one line or two lines, respectively.

For generating the radial push-pull signal the radiation-sensitive surfaces of the detectors 235 and 236 are divided along the lines 237 and 238 which have a direction 232a corresponding to the track direction. For generating the tangential push-pull signal, the detectors 235 and 236 are divided along the lines 239 and 240 with a direction corresponding to a direction perpendicular to the tracks. The detectors 235 and 236 are divided by the lines 237, ..., 240 into four segments denoted by x1, x2, x3 and x4 for detector 236 and y1, y2, y3 and y4 for detector 235.

The photocurrents which are generated by the incident radiation in the segments x1, ..., x4 and y1, ..., y4 will hereinafter be denoted by Ix1, ..., Ix4 and Iy1, ..., Iy4.

The push-pull signals Vppt, Vppr and Vppd and the amplitude signal Vt for regaining the recorded information can be derived in accordance with the relations below:

$$Vt = (Ix1 + Ix2 + Ix3 + Ix4) - (Iy1 + Iy2 + Iy3 + Iy4)$$

$$Vppr = (Ix1 + Ix2 - Ix3 - Ix4) - (Iy1 + Iy2 - Iy3 - Iy4)$$

$$Vppt = (Ix1 - Ix2 + Ix3 - Ix4) - (Iy1 - Iy2 + Iy3 - Iy4)$$

$$Vppd = (Ix1 - Ix2 - Ix3 + Ix4) - (Iy1 - Iy2 - Iy3 + Iy4)$$

It is to be noted that, in principle, the derivation of the signals Vt, Vppr, Vppt and Vppd can be determined on the basis of the photocurrents of only one of the detectors 235 and 236. However, the signal-to-noise ratio of the signals is then so poor that a reliable detection is difficult to realise in practice. It has been described hereinbefore that the ellipticity of the polarization of the return beam caused by the magneto-optical layer corresponds to an influence of the phase of the return beam so that it will become possible to generate push-pull signals. The existing magneto-optical layers are generally optimized for obtaining a large polarization rotation and they are not optimized for obtaining an elliptical polarization. However, it is to be noted that it is not necessary for deriving the push-pull signals to obtain the elliptical polarization at the area of the magneto-optical layer. It is alternatively possible to arrange an optical element in the optical light path of the return beam, which element creates an elliptical polarization which is dependent on the direction of polarization of the light in the return beam. Such an optical element may be, for example, a plane-parallel plate.

Finally it is noted that a phase contrast can also be obtained by arranging a $\tfrac{1}{4}\lambda$ plate across the half cross-section of the return beam, as shown in FIG. 1b of the afore-mentioned Conference Paper by Lynch and Levenson. A dual split detector system for detecting the push-pull signal is then unnecessary.

We claim:

1. An information reading system comprising an information carrier and a reading device, in which system the information carrier has at least two parallel tracks which, viewed in the track direction, are divided into elementary areas, boundary positions defining the boundaries between the elementary areas being aligned in a direction transverse to the track direction, while information is recorded in the parallel tracks by means of information patterns which comprise marks and intermediate areas, the transitions between the marks and the intermediate areas substantially coinciding with the boundary positions, the influence of a mark on radiation differing from the influence of the intermediate areas on said radiation, the device comprising an optical system for directing a radiation beam onto a detection system via the information pattern, with the radiation beam being modulated in conformity with the information pattern, said optical system comprising means for focusing the radiation beam onto the information pattern, while a scanning spot is formed on the information pattern by the radiation beam, and said detection system generating at least one detection signal in dependence upon the modulation of the beam, the device comprising means for scanning the record carrier by means of the scanning spot along a line which is located substantially centrally between said two parallel tracks, the mutual distance between the two parallel tracks being so small that the two parallel tracks are at least partly scanned by the radiation beam, the device comprising signal regeneration means for recovering the recorded information on the basis of the detection signals, said system being characterized in that the distribution of marks and intermediate areas across groups of at least two by two elementary areas is indicative of the recorded information, the signal regeneration means recovers the recorded information from the signal values of the detection signals at the instants when the centre of the scanning spot passes the boundary positions.

2. An information reading system as claimed in claim 1, characterized in that the tracks are grouped in track pairs of two juxtaposed tracks, each track forming only part of one track pair and each group of two by two elementary areas from a track pair representing a bit combination of two logic bits, the scanning means scanning the tracks in accordance with scanning paths located substantially in the centre of the track pairs.

3. An information reading system as claimed in claim 2, characterized in that sixteen different information patterns which are possible within the groups of two by two elementary areas are divided into four configuration groups of four different patterns, each configuration group representing one of the four possible bit combinations which are possible with two bits, and two predetermined adjacent elementary areas located in two different tracks forming four different sub-patterns in each configuration group.

4. An information reading system as claimed in claim 1, characterized in that the information comprises at least three parallel tracks, each group of two by two elementary areas representing one logic bit, the scanning means scanning the tracks along scanning paths which correspond to the centres between each arbitrary pair of two adjacent parallel tracks.

5. An information reading system as claimed in claim 4, characterized in that sixteen different information patterns which are possible within the groups of two by two elementary areas are divided into two configuration groups of eight different patterns each, each configuration group representing one of the two possible logic values of a bit, and three predetermined elementary areas constituting eight different sub-patterns in each configuration group.

6. An information reading system as claimed in claim 5, characterized in that there is an even number of marks in one of the configuration groups and an odd number of marks in the information patterns of the other configuration group.

7. An information reading system as claimed in claim 6, characterized in that the device includes an amplitude detector for supplying an amplitude signal whose signal value is indicative of the extent to which the beam is influenced by the pattern of marks and intermediate areas at the location of the scanning spot, the signal regeneration means being provided with level detection means for detecting the signal level of the amplitude signal and with means for recovering the recorded information only on the basis of the levels detected by the level detection means.

8. An information recording system as claimed in claim 6, characterized in that the record carrier is of a type whose influence of the marks on the phase differs from the influence of the intermediate areas on the phase and in that the device comprises a push-pull detector for supplying a push-pull signal, the signal regeneration means comprising level detection means for detecting the signal level of the push-pull signal, said signal regeneration means being provided with means for recovering the recorded information on the basis of the signal levels detected by the level detection means.

9. An information reading system as claimed in claim 1, characterized in that the detection system comprises an amplitude detector for supplying an amplitude signal whose signal value is indicative of the extent to which the beam is influenced by the pattern of marks and intermediate areas at the location of the scanning spot, the signal generation means being adapted to derive the information on the basis of the signal values of the amplitude signal at the instants when the centre of the scanning spot passes the boundary positions.

10. An information reading system as claimed in claim 1, characterized in that the record carrier is of a type in which the influence of the marks on the phase of the radiation beam differs from the influence of the intermediate areas on said phase, the detection system comprising an amplitude detector for supplying an amplitude signal whose signal value is indicative of the extent to which the beam is influenced by the pattern of marks and intermediate areas at the location of the scanning spot, and comprising a push-pull detector for deriving a push-pull signal from the intensity distribution across the cross-section of the radiation beam influenced by the information pattern, the signal generation means being adapted to derive the information on the basis of the signal values of the amplitude signal and the push-pull signal at the instants when the centre of the scanning spot passes the boundary positions.

11. An information reading system as claimed in claim 10, characterized in that the record carrier is of a magneto-optical type, the detection system comprising a polarizing beam splitter for splitting the modulated radiation beam into a first sub-beam of radiation having a first direction of polarization and a second sub-beam of radiation having a second direction of polarization which is substantially perpendicular to the first direction of polarization, each push-pull detector comprising a first difference detector for detecting intensity differences in the first sub-beam and a second difference detector for detecting intensity differences in the second sub-beam.

12. An information reading system as claimed in claim 1, characterized in that the record carrier is of a type in which the influence of the marks on the phase of the radiation beam differs from the influence of the intermediate areas on said phase, the detection system comprising a push-pull detector for deriving a first and a second push-pull signal from the intensity distribution in two different directions in the cross-section of the radiation beam influenced by the information pattern, the signal generation means being adapted to derive the information from the first and the second push-pull signal.

13. An information reading system as claimed in claim 12, characterized in that the record carrier is of a magneto-optical type, the detection system comprising a polarizing beam splitter for splitting the modulated radiation beam into a first sub-beam of radiation having a first direction of polarization and a second sub-beam of radiation having a second direction of polarization which is substantially perpendicular to the first direction of polarization, each push-pull detector comprising a first difference detector for detecting intensity differences in the first sub-beam and a second difference detector for detecting intensity differences in the second sub-beam.

14. An information reading system as claimed in claim 1, characterized in that the information patterns in the two parallel tracks have periodical interruptions incorporating optically detectable control patterns which define the position of an imaginary line located centrally between the two parallel tracks, the device comprising means for deriving control signals for controlling the scanning of the parallel tracks on the basis of the detection signals generated by sub-detectors during scanning of the control patterns.

* * * * *